United States Patent
Nataraja et al.

(10) Patent No.: US 11,070,423 B1
(45) Date of Patent: Jul. 20, 2021

(54) INTENT DEPLOYMENT IN A NETWORK ENVIRONMENT

(71) Applicant: Cisco Technology, Inc., San Jose, CA (US)

(72) Inventors: Rajesh B. Nataraja, Sunnyvale, CA (US); Ganeshmani Venkatesh, Santa Clara, CA (US); Sujatha Balaraman, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/069,995

(22) Filed: Oct. 14, 2020

(51) Int. Cl.
*H04L 12/24* (2006.01)
*H04L 29/08* (2006.01)

(52) U.S. Cl.
CPC .... *H04L 41/0806* (2013.01); *H04L 29/08135* (2013.01); *H04L 41/0823* (2013.01); *H04L 41/0869* (2013.01); *H04L 41/0883* (2013.01); *H04L 41/0893* (2013.01); *H04L 41/5045* (2013.01); *H04L 41/5048* (2013.01); *H04L 41/5051* (2013.01); *H04L 41/5054* (2013.01); *H04L 67/10* (2013.01)

(58) Field of Classification Search
CPC . H04L 29/08135; H04L 41/0803–0823; H04L 41/0866–0893; H04L 41/5041–5054; H04L 67/10
See application file for complete search history.

(56) References Cited

U.S. PATENT DOCUMENTS

| | | | |
|---|---|---|---|
| 2017/0285981 A1* | 10/2017 | DeArment | G06F 11/07 |
| 2018/0176016 A1 | 6/2018 | Deodhar et al. | |
| 2019/0116110 A1* | 4/2019 | Raney | H04L 43/50 |
| 2019/0213004 A1* | 7/2019 | Zhu | G06F 8/71 |
| 2020/0007403 A1 | 1/2020 | Rao et al. | |
| 2020/0127987 A1 | 4/2020 | Sharma et al. | |
| 2020/0133689 A1 | 4/2020 | Ferrell et al. | |

FOREIGN PATENT DOCUMENTS

WO    2018149701 A1    8/2018

OTHER PUBLICATIONS

Cisco System, Inc., "Cisco DCNM Release Notes, Release 11.3(1)", Dec. 20, 2019, 50 pages.

* cited by examiner

*Primary Examiner* — Brendan Y Higa
(74) *Attorney, Agent, or Firm* — Edell, Shapiro & Finnan, LLC

(57) ABSTRACT

In one example, a network device detects when a deployment request for the network device from a network controller is stored in a directory corresponding to the network device. Deployment information is stored as a value of a first key in the directory and includes information to configure the network device to attain a set of goals. The network device retrieves the deployment information from the directory. The network device is configured to attain the set of goals by the network device applying the retrieved deployment information. The network device generates one or more status notifications indicating a status of configuring the network device, and stores the one or more status notifications as a value of a second key in the directory to indicate the status to the network controller.

20 Claims, 9 Drawing Sheets

900

910 — DETECTING, AT A NETWORK DEVICE, WHEN A DEPLOYMENT REQUEST FOR THE NETWORK DEVICE FROM A NETWORK CONTROLLER IS STORED IN A DIRECTORY CORRESPONDING TO THE NETWORK DEVICE, WHEREIN DEPLOYMENT INFORMATION IS STORED AS A VALUE OF A FIRST KEY IN THE DIRECTORY AND INCLUDES INFORMATION TO CONFIGURE THE NETWORK DEVICE TO ATTAIN A SET OF GOALS

920 — RETRIEVING BY THE NETWORK DEVICE THE DEPLOYMENT INFORMATION FROM THE DIRECTORY

930 — CONFIGURING THE NETWORK DEVICE TO ATTAIN THE SET OF GOALS BY THE NETWORK DEVICE APPLYING THE RETRIEVED DEPLOYMENT INFORMATION

940 — GENERATING, BY THE NETWORK DEVICE, ONE OR MORE STATUS NOTIFICATIONS INDICATING A STATUS OF CONFIGURING THE NETWORK DEVICE AND STORING THE ONE OR MORE STATUS NOTIFICATIONS AS A VALUE OF A SECOND KEY IN THE DIRECTORY TO INDICATE THE STATUS TO THE NETWORK CONTROLLER

FIG.9

US 11,070,423 B1

INTENT DEPLOYMENT IN A NETWORK ENVIRONMENT

TECHNICAL FIELD

The present disclosure relates to deploying intents to switches and/or other network devices.

BACKGROUND

Software Defined Networking in a datacenter involves deploying complex intents across multiple elements of a datacenter. An intent is basically a description of a goal or purpose to be attained. Paradigms of software development and information technology operations (DevOps) for intent deployment include declarative and imperative. In the imperative paradigm, a user defines each single step for achieving an intent. In contrast, the declarative paradigm enables a user to define an intent and a network controller provides the steps to attain the intent. Users are currently transitioning from the imperative paradigm toward the declarative paradigm. With respect to the declarative paradigm, the network controller is responsible for managing the intent and ensuring that a state of a switch accurately matches the intent. The network controller may perform various tasks for intent deployment, such as deploying the appropriate configurations in the right sequence with appropriate error handling/retry integrations and dependency manipulations.

BRIEF DESCRIPTION OF THE DRAWINGS

FIG. 9 illustrates a flowchart of a generalized method for deploying an intent in a network environment, according to an example embodiment.

DESCRIPTION OF EXAMPLE EMBODIMENTS

Overview

Figure 1:
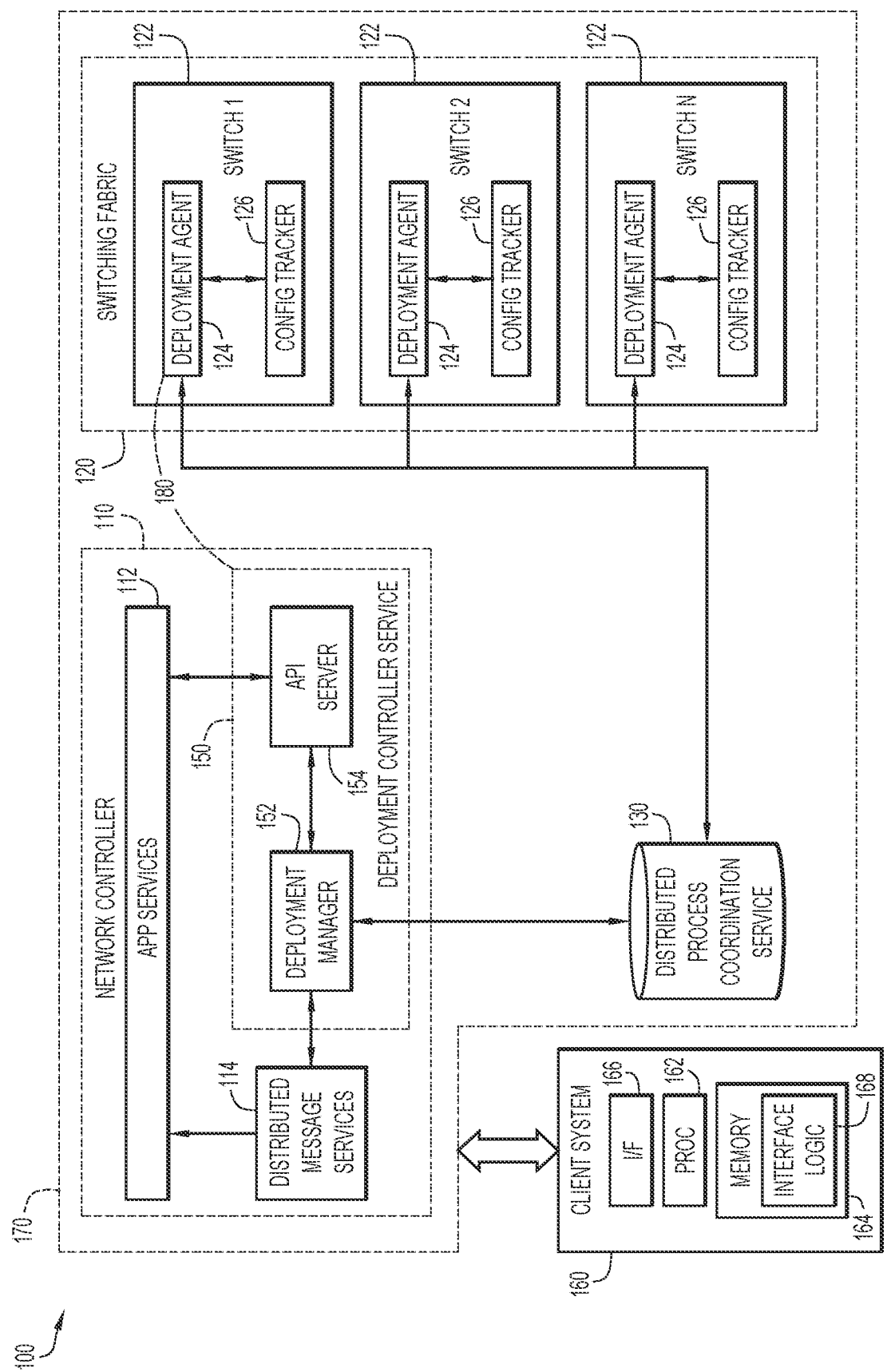
FIG. 1 illustrates a block diagram of a system configured for intent deployment, according to an example embodiment.

In one example embodiment, a network device detects when a deployment request for the network device from a network controller is stored in a directory corresponding to the network device. Deployment information is stored as a value of a first key in the directory and includes information to configure the network device to attain a set of goals. The network device retrieves the deployment information from the directory. The network device is configured to attain the set of goals by the network device applying the retrieved deployment information. The network device generates one or more status notifications indicating a status of configuring the network device, and stores the one or more status notifications as a value of a second key in the directory to indicate the status to the network controller.

Example Embodiments

Software Defined Networking in a datacenter involves deploying complex intents across multiple elements of the datacenter. An intent is basically a description of a goal or purpose to be attained. Intents are typically deployed on standalone datacenter switches using a command line interface (CLI). Deployment of an intent may range from deploying a few command lines to deploying thousands of command lines. A network controller may deliver switching fabric solutions for datacenter network intent deployment. The network controller is able to build or learn switching fabrics of hundreds of switching devices based on physical connectivity.

Paradigms of software development and information technology operations (DevOps) for intent deployment include declarative and imperative. In the imperative paradigm, a user defines each single step for achieving an intent. In contrast, the declarative paradigm enables a user to define an intent and a network controller provides the steps to attain the intent. Users are currently transitioning from the imperative paradigm toward the declarative paradigm. With respect to the declarative paradigm, the network controller is responsible for managing the intent and ensuring that a state of the switch accurately matches the intent. The network controller may perform various tasks for intent deployment, such as deploying the appropriate configurations in the right sequence with appropriate error handling/retry integrations and dependency manipulations.

A network controller has several challenges for intent deployment. For example, a given intent needs to be deployed in an accurate and/or pre-defined sequence. In order to ensure adherence to this sequence, the intent is deployed over a dedicated secure shell (SSH) connection to the switch. However, this approach often suffers at high switch scale.

Further, intent deployment should be completed in a reasonable time and closely match the time for a dedicated operator to perform the deployment on a switch secure shell (SSH)/console session. This is achieved by distributing the request for intent deployment across multiple deployment agents that are running on an external compute cluster. However, the usage of SSH connections and the communications between the network controller and switch for each line of command line interface (CLI) deployment adds significant overhead to the intent deployment process. Further, since connections may not always be available, connections may need to be terminated and re-created.

Moreover, intent deployment requires monitoring of the progress and accurate and current progress representations. In addition, providing assurances requires continuous monitoring of the state of the switch to ensure adherence to the intent, especially for networks spanning hundreds of switches. Actions for providing assurances also include offering instant updates and remedial action. These are challenging tasks at scale.

Consistent and responsive intent deployment is a critical component to the success of a network controller. Intent assurance/monitoring (i.e., periodic compliance checks and periodic status checks of switches) is also critical for managing large switching fabrics using network controllers. However, these are challenging tasks for a network controller in a large scale network environment. Deploying a more powerful network controller that consumes additional resources as the scale of the switching fabric being managed increases does not provide an optimal solution, and should be reserved for large scale data collection and mining.

Accordingly, an embodiment improves intent deployment for locations having large scale increases in the quantity of switches. For example, the embodiment may improve intent deployment for a location having hundreds of switches and being requested to scale to more than a thousand switches. The embodiment uses a distributed process coordination service, such as etcd, running on a network controller cluster. This enables switches to interact, via the distributed process coordination service, with a deployment controller service of the network controller that processes requests for intent deployment. The distributed process coordination service handles distributed task coordination and stores and manages keys at large scale.

An embodiment ensures that an appropriate configuration for the switch is applied with a proper accounting to accommodate all corner cases (e.g., cases outside of normal operating parameters). Representational State Transfer (REST) interaction is avoided at an implementation level since tools are realized to resolve distributed coordination issues. In addition, command line interface (CLI) intent deployment is completely offloaded to the switch to avoid communications over dedicated secure shell (SSH) channels between the network controller and the switch.

Embodiments provide several advantages. For example, periodic tasks can be executed by deployment agents running on the switches (i.e., without any direct network controller intervention). This significantly improves network controller performance. The intent deployment is highly consistent due to the use of a distributed process coordination service (e.g., etcd) employing a key-value store. Further, special heartbeat mechanisms between the deployment controller service and agents are avoided since these are provided inside the distributed process coordination service (e.g., etcd). The embodiments accommodate different failures that could happen, and ensure that a network controller job avoids remaining in an unknown state. Whenever failed services restart, the intent deployment can resume from the point of the failure.

FIG. 1 illustrates a block diagram of an example system 100 configured for intent deployment according to an example embodiment. System 100 includes a network controller 110, a switching fabric 120, a distributed process coordination service 130, and a client or end-user system 160. Network controller 110, switching fabric 120, and distributed process coordination service 130 may form a datacenter 170. However, any conventional or other type of network environment may be utilized. The datacenter components may communicate over a network (not shown) providing internal and/or external communications for the datacenter. Client system 160 may reside within datacenter 170 or be remote from datacenter 170 and communicate with the datacenter over the network.

Network controller 110 includes a set of micro-services that are used to manage standalone or other networks within datacenter 170. Network controller 110 may be hosted in a multi-node container cluster that may further host distributed process coordination service 130. For example, the container cluster may be implemented by a Kubernetes (K8s) cluster including three nodes; however, any conventional or other container or type of computing cluster of any quantity of nodes may be employed. Switching fabric 120 includes one or more switches 122 (e.g., Switch 1 to Switch N as viewed in FIG. 1) to form one or more networks for the datacenter or other network environment.

System 100 further includes an infrastructure service 180 for intent deployment. The infrastructure service serves as a transport for network controller applications to communicate with switches 122 of switching fabric 120 through distributed process coordination service 130. The infrastructure service includes a deployment controller service 150 on network controller 110 and a deployment agent service including a deployment agent 124 and configuration tracker 126 residing on each switch 122.

Network controller 110 includes application services 112, distributed message services 114, and deployment controller service 150. Application services 112 provide a user interface (e.g., graphical user interface (GUI), etc.) for receiving and processing requests for intent deployment. The requests may include an intent to deploy, where the intent includes a set of goals or purposes for a network. In other words, the intent specifies a state or manner in which a network (or switch) is to operate and defines a configuration for the network (or switch). In an example embodiment, the intent may be specified in the user interface via a template or workflow. The workflow may be graphical or textual. However, the intent may be specified in any desired manner. In addition, one or more particular switches may be indicated for the deployment. It will be appreciated that embodiments may deploy an intent or configuration to any quantity of network devices in substantially the same manner described below. A network device may be any device that is a component of, coupled to, or uses a network. For example, a network device may include a router, switch, hub, node, or other processing device.

Application services 112 analyze the intent to generate deployment information. The deployment information may include commands, configuration parameters, and/or other configuration information that configure one or more switches to attain the set of goals or purposes. For example, application services 112 may generate a set of one or more command line interface (CLI) commands to configure the one or more switches. The set of one or more CLI commands may be in the form of one or more lines for a CLI, with each line including one or more CLI commands. However, any type of commands, configuration parameters, and/or other configuration information may be generated to implement the intent on the switches. In addition, application services 112 may determine the particular switches for the deployment based on the intent.

Distributed message services 114 translate status updates for intent deployment and provide notifications to application services 112. The application services provide the status updates to a requesting user of client system 160. For example, the status updates may be written to a corresponding topic maintained by distributed message services 114, and provided to application services 112 based on subscriptions to the topic. In an example embodiment, the distributed message services may be implemented by APACHE KAFKA; however, any conventional or other message service may be employed.

Deployment controller service 150 includes deployment manager 152 and application programming interface (API) server 154. Deployment manager 152 receives and processes a deployment request from application services 112 to deploy an intent to switching fabric 120. The deployment manager writes the deployment information for the intent to distributed process coordination service 130 to initiate intent deployment as described below. API server 154 provides application programming interfaces (APIs) to specify to deployment manager 152 the deployment information and the particular switches to be provisioned.

Client system 160 may present a graphical user or other interface to solicit information from users pertaining to the desired actions (e.g., deploy an intent), and may provide reports including progress and/or results of the desired actions. The interface may include a graphical user interface (GUI), command line prompts, menu screens, etc. In an example embodiment, the client system may present a GUI provided by application services 112 to enable a user to specify and request deployment of the intent. Client system 160 may be implemented by any conventional or other computer systems, such as a laptop, desktop, tablet, smartphone or other mobile computing device, etc. Client system 160 is preferably equipped with a display or monitor, a base, optional input devices, and any commercially available and custom software. The base preferably includes at least one hardware processor 162, such as a microprocessor, controller, central processing unit (CPU), etc., one or more memories 164, and internal or external network interfaces or communications devices 166. The communications devices may include a modem, network cards, etc., while the input devices may include a keyboard, mouse, touch screen, or other input device. The software may include interface logic 168 for interacting with application services 112, and is provided for execution by at least one hardware processor 162.

The deployment information (e.g., set of command line interface (CLI) commands, etc.) for deploying the intent is written to distributed process coordination service 130. In an example embodiment, the distributed process coordination service is implemented by etcd. The distributed process coordination service may include a directory structure for storing key-value pairs with a corresponding directory for each switch 122. The corresponding directory includes keys pertaining to deployment requests and deployment status notifications for the corresponding switch. The value for a deployment request key includes the deployment information to deploy the intent. For example, the value for the deployment request key may include the set of CLI commands for the intent. The value for a deployment status notification key includes status information for the intent deployment. However, any conventional or other type of coordination service or data store may be employed. The intent stored in distributed process coordination service 130 may not be an entire intent for a switch 122, but only a portion of the intent network controller 110 desires to deploy at a given moment. For example, this portion of the intent may range from a couple of CLI lines or commands to thousands of CLI lines or commands.

A distributed process coordination service provides consistency in terms of ensuring that the intent to be applied is strictly written to a persistent store in all scenarios, and an ability to consistently handle failure scenarios to reduce the chances of applying a same or incorrect configuration when a deployment process unintentionally crashes or encounters a fault. A distributed process coordination service is also more manageable than a messaging service since the provided intent may be manipulated for any reasons in the distributed process coordination service. In contrast, a message sent by a messaging service is extremely difficult to withdraw or modify. In addition, distributed coordination constructs of a distributed process coordination service provide an ability to seamlessly handle various scenarios, such as when the deployment agent service may not be able to be installed on a switch as described below.

Figure 2:
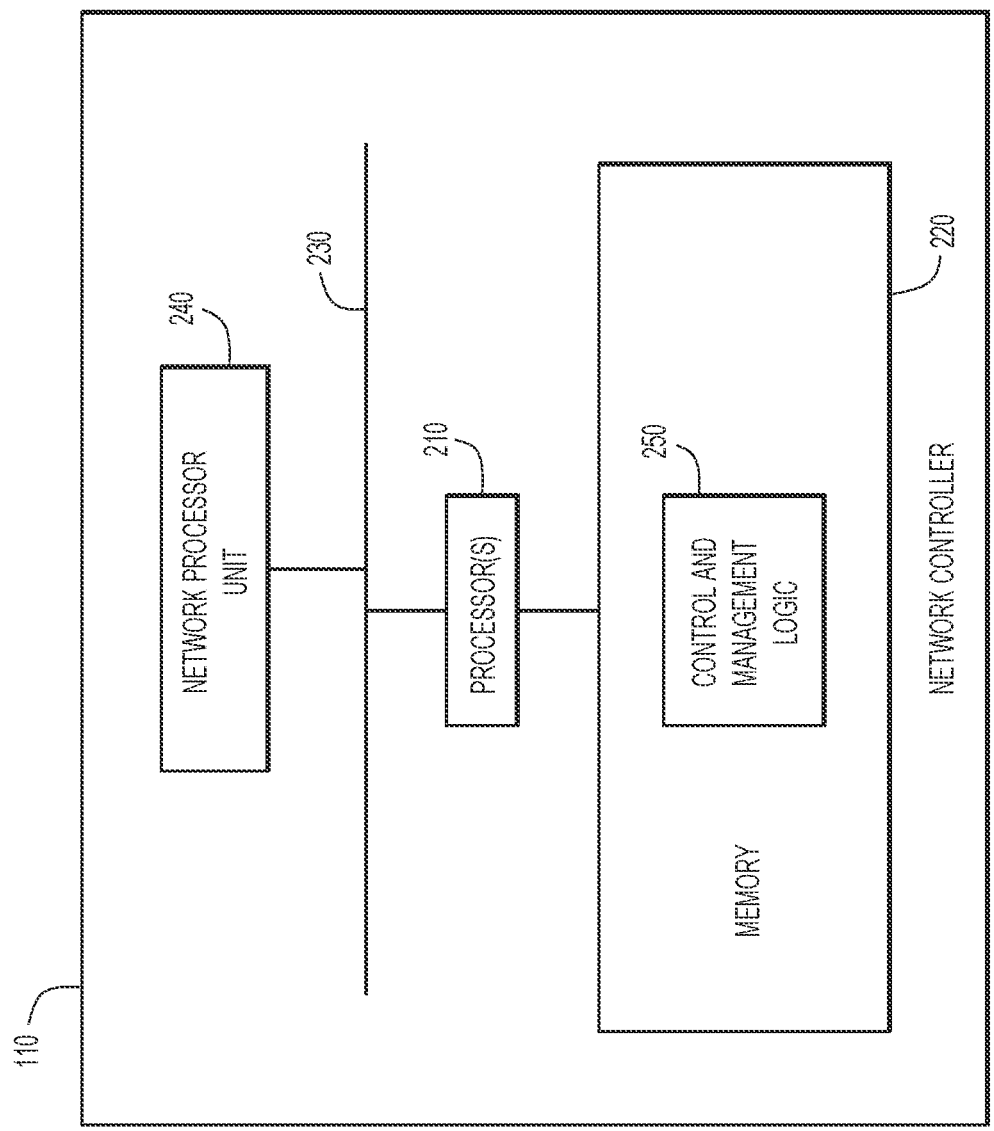
FIG. 2 is a block diagram of a network controller configured for intent deployment, according to an example embodiment.

Reference is now made to FIG. 2. FIG. 2 illustrates a block diagram of network controller 110 (e.g., a node of the container cluster hosting network controller 110) or other computing/control entity referred to herein according to an example embodiment. The network controller includes one or more processors 210, a memory 220, a bus 230, and a network interface unit 240, such as one or more network interface cards that enable network connectivity. The memory 220 stores instructions for control and management logic 250, that when executed by the processor 210, cause the processor to perform the network controller operations described herein. For example, control and management logic 250 may include application services 112, distributed message services 114, and deployment manager 152 and API server 154 of deployment controller service 150.

The memory 220 may include ROM of any type now known or hereinafter developed, RAM of any type now known or hereinafter developed, magnetic disk storage media devices, tamper-proof storage, optical storage media devices, flash memory devices, electrical, optical, or other physical/tangible memory storage devices. In general, the memory 220 may comprise one or more tangible (non-transitory) computer readable storage media (e.g., a memory device) encoded with software comprising computer executable instructions and when the software is executed (by the processor 210) it is operable to perform the network controller operations described herein.

Figure 3:
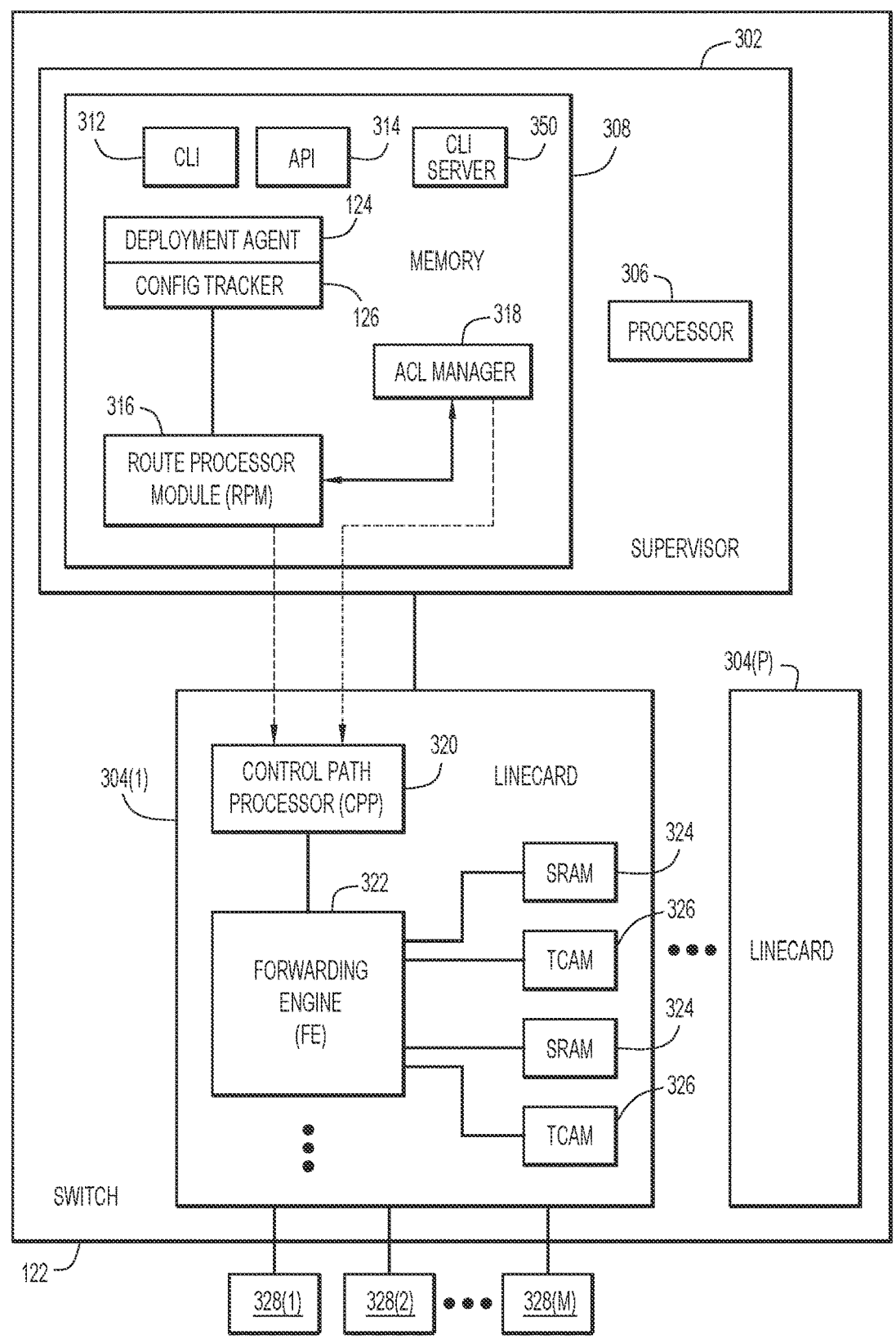
FIG. 3 is a block diagram of a switch configured for intent deployment, according to an example embodiment.

FIG. 3 is a block diagram of an example switch 122 of switching fabric 120 configured for intent deployment according to an example embodiment. The switch includes a supervisor module 302 and a plurality of linecards 304(1)-304(P). The supervisor module 302 includes a processor (e.g., microprocessor or microcontroller) 306 and memory 308. The supervisor module 302 includes various software modules, including deployment agent 124 and configuration tracker 126. An Application Programming Interface (API) 314 makes an interface (e.g., CLI) 312 available outside of the switch (e.g., Nx-API). A Route Processor Module (RPM) 316 is configured to communicate with an access control list (ACL) manager 318. A CLI server 350 may execute CLI commands from configuration tracker 126. The configuration tracker may receive from deployment agent 124 CLI commands included within deployment information associated with a deployment request as described below. The linecards 304(1)-304(P) each include a Control Path Processor (CPP) 320 configured to program a plurality of Forwarding Engines (FEs) 322, which are hardware application-specific integrated circuits (ASICs). Each FE 322 in a linecard is associated with respective Static Random Access Memories (SRAMs) 324 and Ternary Content-Addressable Memories (TCAMs) 326. Traffic enters the switch 122 at one of a plurality of network ports 328(1)-328(M) of a given linecard 304(1)-304(P), and leaves the switch via one of the plurality of network ports 328(1)-328(M) of a given linecard 304(1)-304(P).

The deployment agent 124 may be configured to provide the set of command line interface (CLI) commands that may be included within deployment information from distributed process coordination service 130 and monitor progress of the intent deployment. Configuration tracker 126 may be configured to enable execution of those CLI commands by CLI server 350 to configure the switch. The CPPs 320 may program the FEs 322 in accordance with the operations provided herein (e.g., in accordance with a deployed intent). The FEs 322 communicate with TCAMs 326, which may store respective match ACLs, and the SRAM 324 may store the action to be taken if there is a match (e.g., to which switch interface (to which an application is connected) to forward a network packet).

The software modules on the supervisor module 302 may be implemented on at least one memory 308 and at least one processor 306. The memory 308 may comprise read only memory (ROM), random access memory (RAM), magnetic disk storage media devices, optical storage media devices, flash memory devices, electrical, optical, or other physical/tangible memory storage devices. Thus, in general, the memory 308 may comprise one or more tangible (non-transitory) computer readable storage media (e.g., a memory device) encoded with software comprising computer executable instructions and when the software is executed (by the processor) it is operable to perform the operations described herein.

Figure 4:
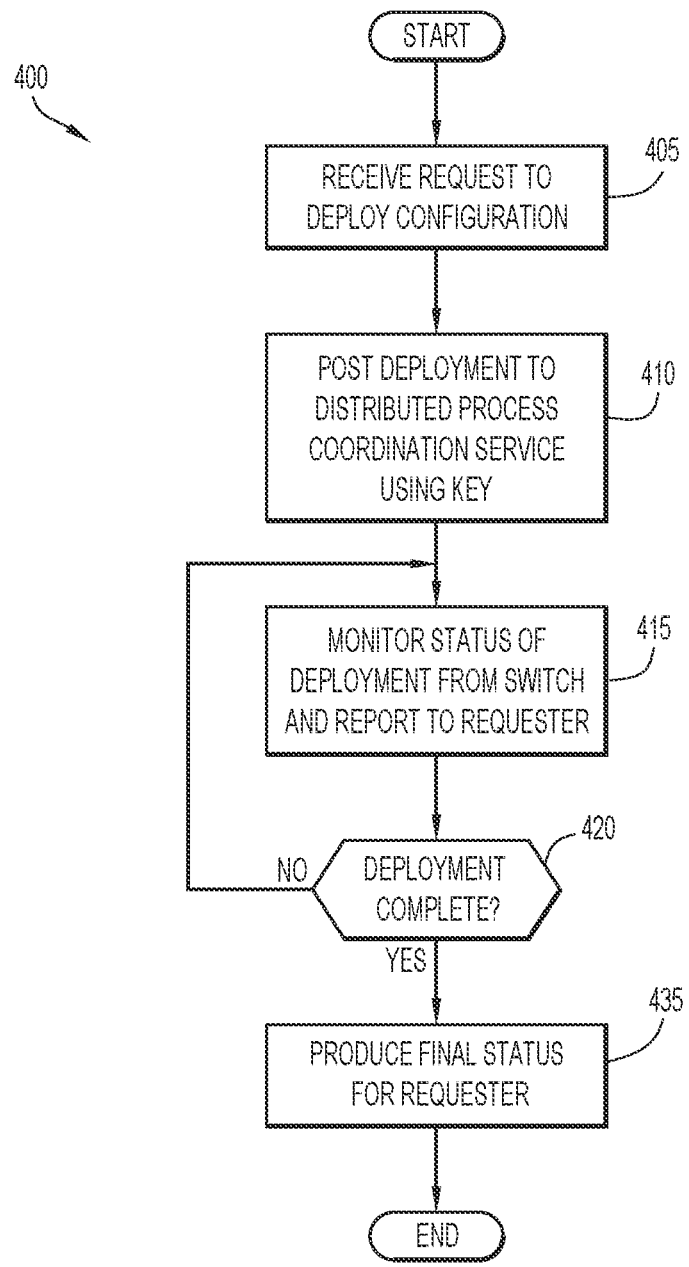
FIG. 4 illustrates a flowchart of a method to initiate intent deployment, according to an example embodiment.

With continued reference to FIG. 1, FIG. 4 illustrates a flowchart of an example method 400 for initiating deployment of an intent to switching fabric 120 according to an embodiment. While the operations of FIG. 4 are described as being performed by network controller 110, it will be appreciated that other components of system 100 may additionally/alternatively perform any of these operations. In addition, while the operations of FIG. 4 are described with respect to deploying an intent to a switch, an intent or configuration may be deployed in substantially the same manner described below to any quantity of network devices. A network device may be any device that is a component of, coupled to, or uses a network. For example, a network device may include a router, switch, hub, node, or other processing device.

At operation 405, network controller 110 receives a deployment request from client system 160 to deploy an intent to one or more switches 122 of switching fabric 120. For example, the intent may be specified from a template or workflow entered by a user in a graphical user (GUI) or other interface provided by application services 112 and presented by client system 160 as described above. The deployment request may further be initiated from the interface. Application services 112 analyze the intent to generate deployment information for implementing the intent. For example, the deployment information may include a set of one or more command line interface (CLI) commands. API server 154 provides application programming interfaces (APIs) to specify to deployment manager 152 the deployment information and one or more switches for the deployment. Application services 112 may determine the one or more switches for the intent deployment based on the analysis of the intent, or a user may specify the one or more switches (e.g., when providing the intent on the GUI, etc.). The APIs provided by API server 154 may generate a request identifier to enable the particular request to be referenced. The request identifier may be any suitable identifier in any format (e.g., numeric, alphanumeric, symbols, etc.), preferably uniquely identifies a deployment request, and may be generated in various manners. For example, a counter may be incremented by any desired increment (e.g., 1, 2, 5, 10, 100, etc.) to generate the request identifier, or a random number/sequence generator may be employed.

At operation 410, deployment manager 152 posts or writes deployment information to distributed process coordination service 130. The distributed process coordination service includes a directory structure, where each switch is associated with a corresponding directory based on a switch identifier. A directory path of distributed process coordination service 130 includes the switch identifier to enable switches to identify and monitor their corresponding directories for deployment requests. For example, a switch identifier may include a switch serial number that forms the path to the corresponding directory. The switch identifier may be any suitable identifier in any format (e.g., numeric, alphanumeric, symbols, etc.), preferably uniquely identifies a switch, and may be determined in various manners. For example, a counter may be incremented by any desired increment (e.g., 1, 2, 5, 10, 100, etc.) to generate the switch identifier, a pre-assigned identifier (e.g., serial number, etc.) for the switch may be used, and/or a random number/sequence generator may be employed.

Deployment manager 152 writes deployment information to a corresponding directory of distributed process coordination service 130 for each switch specified for intent deployment. For example, a directory path for a switch 122 may be of the form: /root/config/switch serial number/intent/, where the switch serial number indicates a serial number of the corresponding switch. In this example, the root directory is a top level directory of the directory structure or hierarchy that may include various child or sub-directories. In the example, config is a child of the root directory, switch serial number is a sub-directory of the config directory, and intent is a sub-directory of the switch serial number directory. The switch serial number associates the switch serial number directory to the corresponding switch, while the intent sub-directory stores keys for deployment requests for the corresponding switch. However, directories for switches may reside at any locations within the directory structure or hierarchy.

One or more keys associated with deployment requests may be stored within the directory (e.g., the intent directory) associated with the switch. In an example embodiment, the key (e.g., request-<id>) may be referenced by a path having the form: /root/config/switch serial number/intent/request-<id>, where id is the request identifier that identifies the particular deployment request as described above. The value of the key includes the deployment information (e.g., the set of command line interface (CLI) commands, etc.) to deploy the intent on the corresponding switch. Thus, the request identifier basically forms the key for a deployment request within a directory corresponding to a switch, where the key has a value containing the deployment information. For example, a request identifier of '1234' may be used to produce a key of the form 'request-1234'; however, the key may have any desired type of characters and format (e.g., numeric, alphanumeric, symbols, etc.). Accordingly, different deployment information (or sets of CLI commands) may be stored for different deployment requests (or request identifiers).

Switches 122 of switching fabric 120 monitor their corresponding directories for deployment requests. Distributed process coordination service 130 provides notifications in response to changes to directories or key values. Accordingly, when a new deployment request is written to the corresponding directory, a notification is provided to deployment agent 124 of the corresponding switch indicating information pertaining to the change (e.g., directory, key, type of change, etc.).

When a deployment request for a switch 122 is detected by deployment agent 124, the deployment agent retrieves the deployment information from distributed process coordination service 130 based on the change information and detected key. The set of CLI commands of the deployment information is provided to configuration tracker 126 for execution by CLI server 350 (FIG. 3). The configuration tracker provides status of each command execution to deployment agent 124 that monitors the status or progress of the execution of each CLI command for the intent deployment.

Status notifications are written by switches 122 to corresponding directories in distributed process coordination service 130 to indicate the status or progress of the intent deployment. In an example embodiment, a status notification is provided for each command line interface (CLI) command in the set of CLI commands for the intent. The status information is written as a value of a key within the corresponding switch directory (e.g., intent directory as described above) based on a status identifier. For example, the key (e.g., status <id>) may be referenced by: /root/config/switch serial number/intent/status-<id>, where the switch serial number refers to switch 122 and id is the status identifier for the status notification. Thus, the status identifier basically forms the key for a status notification within a directory corresponding to a switch, where the key has a value containing the status notification. For example, a status identifier of '1234' may correspond to its request identifier of '1234' and may be used to produce a key of the form 'status-1234'; however, the key may have any desired type of characters and format (e.g., numeric, alphanumeric, symbols, etc.). The keys for the deployment request and status notification may reside in the same or different directories within the directory structure. The status identifier may assist in determining a point to resume an intent deployment in case of a failure. The status identifier may correspond to its request identifier, may be any suitable identifier in any format (e.g., numeric, alphanumeric, symbols, etc.), preferably uniquely identifies a status notification, and may be generated in various manners. For example, a counter may be incremented by any desired increment (e.g., 1, 2, 5, 10, 100, etc.) to generate the status identifier, or a random number/sequence generator may be employed.

At operation 415, deployment manager 152 monitors directories of the switches in the deployment request for the status notifications in distributed process coordination service 130. The distributed process coordination service provides notifications in response to changes to directories or key values. Accordingly, when a new status notification is written to a monitored directory, a notification is provided to deployment manager 152 indicating information pertaining to the change (e.g., directory, key, type of change, etc.). The deployment manager retrieves the status notification from distributed process coordination service 130 based on the change information and detected key, and reports the current status of the intent deployment to distributed message services 114. Application services 112 retrieve the current status from the message services. For example, this may be accomplished by deployment manager 152 providing the current status to a corresponding topic within distributed message services 114, and the application services subscribing to the topic to receive the current status. The deployment manager may aggregate or combine information within status notifications, and report the current status based on the aggregated information to distributed message services 114 at any desired time intervals (e.g., periodic, for specific quantities of CLI commands, for specific quantities of status notifications, etc.).

When the intent deployment is not completed as determined at operation 420, deployment manager 152 resumes monitoring directories of distributed process coordination service 130 for status notifications at operation 415 as described above.

When the status notifications from deployment agent 124 of each of the switches specified in the deployment request indicate completion of the intent deployment as determined at operation 420, deployment manager 152 compiles the status notifications and caches or stores a final response for the request at operation 435. Application services 112 may retrieve the final response, and provide the final response to client system 160. For example, deployment manager 152 may provide the final response to a topic of distributed message services 114, where application services 112 subscribe to the topic to retrieve the final response for forwarding to the client system.

Figure 5:
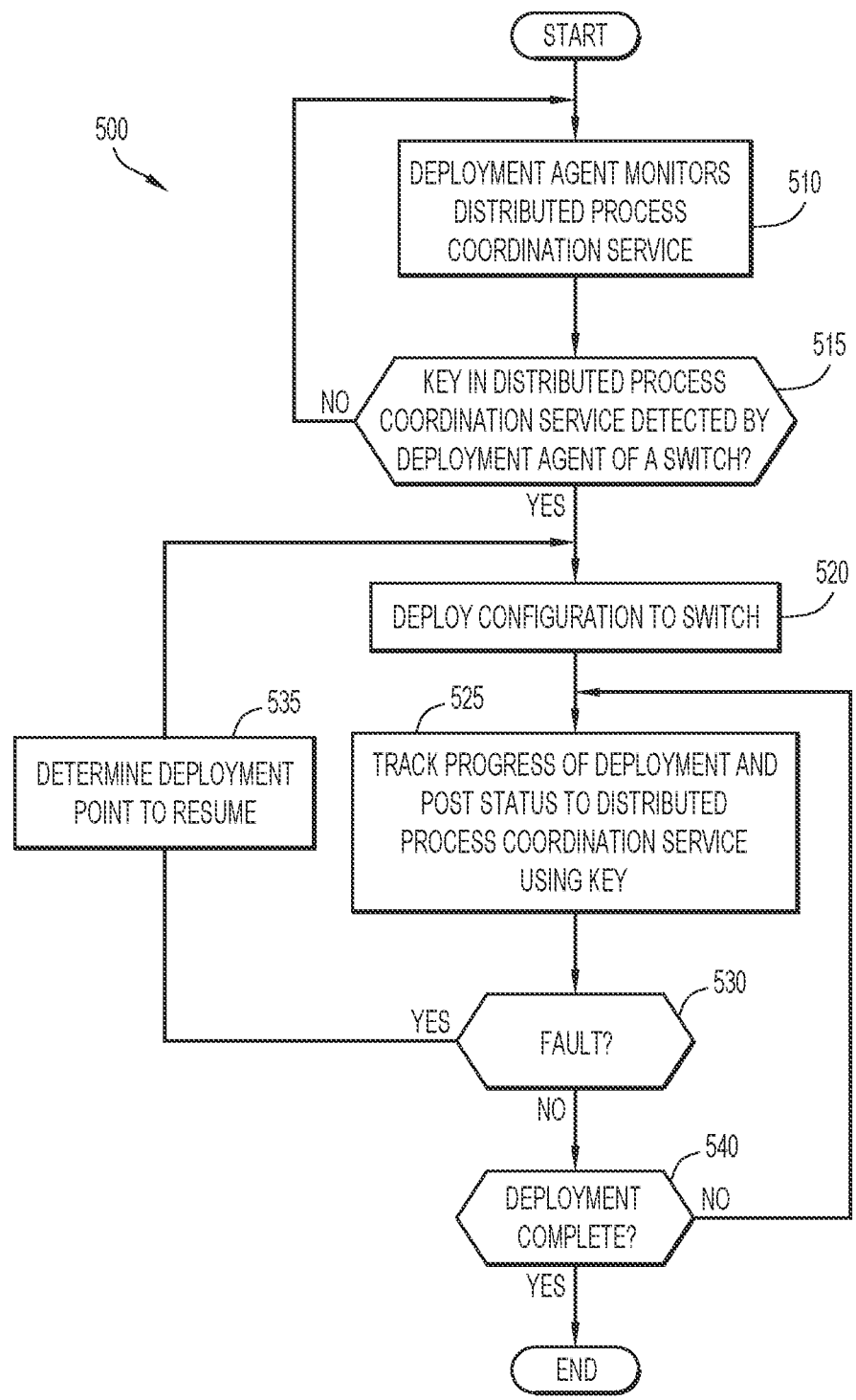
FIG. 5 illustrates a flowchart of a method to deploy an intent to a switch, according to an example embodiment.

With continued reference to FIG. 1, FIG. 5 illustrates a flowchart of an example method 500 for deploying an intent to switching fabric 120 according to an embodiment. While the operations of FIG. 5 are described as being performed by a switch 122 of switching fabric 120, it will be appreciated that any quantity of switches may perform these operations to deploy the same or different intents to those switches. It will be further appreciated that other components of system 100 may additionally/alternatively perform any of these operations. In addition, while the operations of FIG. 5 are described with respect to deploying an intent to a switch, an intent or configuration may be deployed in substantially the same manner described below to any quantity of network devices. A network device may be any device that is a component of, coupled to, or uses a network. For example, a network device may include a router, switch, hub, node, or other processing device.

Initially, when a switch 122 is imported into switching fabric 120, deployment agent 124 and configuration tracker 126 are installed on the switch along with the required information (e.g., certificates, credentials, etc.) for accessing distributed process coordination service 130.

Deployment agent 124 of a switch 122 monitors distributed process coordination service 130 for a deployment request at operation 510. Deployment manager 152 of network controller 110 writes deployment information to a corresponding directory of distributed process coordination service 130 for each switch specified in a request for intent deployment as described above. For example, a directory path for a switch 122 may be of the form: /root/config/switch serial number/intent/, where the switch serial number indicates a serial number of the corresponding switch. One or more keys associated with deployment requests may be stored within the directory associated with the directory path. For example, the key (e.g., request-<id>) may be referenced by a path of the form: /root/config/switch serial number/intent/request-<id>, where id is the request identifier that identifies the particular request. The value of the key includes the deployment information to deploy the intent on the corresponding switch. The deployment information may include the set of command line interface (CLI) commands.

Switch 122 monitors its corresponding directory for a deployment request. Distributed process coordination service 130 provides notifications in response to changes to directories or key values. Accordingly, when a new deployment request is written to the corresponding directory, a notification is provided to deployment agent 124 of switch 122 indicating information pertaining to the change (e.g., directory, key, type of change, etc.). When a deployment request is detected by deployment agent 124 at operation 515, the deployment agent deploys the intent of the deployment request at operation 520. This may be accomplished by deployment agent 124 retrieving the deployment information (e.g., set of command line interface (CLI) commands, etc.) from distributed process coordination service 130 based on the change information and detected key, and locally opening a virtual shell (VSH) or other session to CLI server 350 (FIG. 3). Deployment agent 124 provides the set of CLI commands of the deployment information to configuration tracker 126. The configuration tracker submits the CLI commands to CLI server 350 to execute the commands in order to configure switch 122. The CLI commands are preferably executed one command at a time; however, any quantity of commands may be executed at a time.

Configuration tracker 126 of switch 122 receives a status of each command execution from CLI server 350, and provides this status to deployment agent 124 to track progress of the intent deployment. Deployment agent 124 posts or writes a status notification to distributed process coordination service 130 at operation 525. For example, the progress may be determined based on a quantity of CLI commands executed for the deployment request. In an example embodiment, a status notification is provided for each command line interface (CLI) command in the set of CLI commands for the intent. The status information is written as a value of a key within the corresponding switch directory (e.g., intent directory as described above) based on a status identifier. For example, the key (e.g., status-<id>) may be referenced by a path of the form: /root/config/switch serial number/intent/status-<id>, where the switch serial number is the serial number of switch 122 and id is the status identifier for the status notification. Thus, the status identifier basically forms the key for a status notification within a directory corresponding to a switch, where the key has a value containing the status notification. For example, a status identifier of '1234' may correspond to its request identifier of '1234' and may be used to produce a key of the form 'status-1234'; however, the key may have any desired type of characters and format (e.g., numeric, alphanumeric, symbols, etc.). The keys for the deployment request and status notification may reside in the same or different directories within the directory structure. The status identifier may assist in determining a point to resume an intent deployment in case of a failure. The status identifier may correspond to its request identifier, may be any suitable identifier in any format (e.g., numeric, alphanumeric, symbols, etc.), preferably uniquely identifies a status notification, and may be generated in various manners. For example, a counter may be incremented by any desired increment (e.g., 1, 2, 5, 10, 100, etc.) to generate the status identifier, or a random number/sequence generator may be employed.

By way of example only, the status notification may indicate a most recent command in the deployment information that was executed (e.g., indicated by a command identifier or line number), success or failure of the command and a reason for the failure, and any output of a command when the command was issued. However, since a minimal amount of commands provide output that needs to be processed, scaling should be accommodated.

During intent deployment, a fault may be caused by a restart of a process or device. When a fault is detected at operation 530, deployment agent 124 determines a point to resume the intent deployment from where the deployment was interrupted at operation 535. This may be accomplished by analyzing the status notifications and deployment information in distributed process coordination service 130. For example, the CLI commands for the intent deployment are stored in the distributed process coordination service along with the status notifications including information indicating the last successfully executed command for the intent deployment. Based on this information, deployment agent 124 may determine to resume the intent deployment from the stored CLI command after the last successfully completed command indicated in the status notifications. The intent deployment resumes from the determined point in the prior intent deployment process at operation 520 to deploy the intent as described above.

When further processing remains for the intent deployment as determined at operation 540, deployment agent 124 monitors further progress of the intent deployment and posts status notifications to distributed process coordination service 130 at operation 525 as described above. The above process is repeated until the intent deployment is completed as determined at operation 540.

Figure 6:
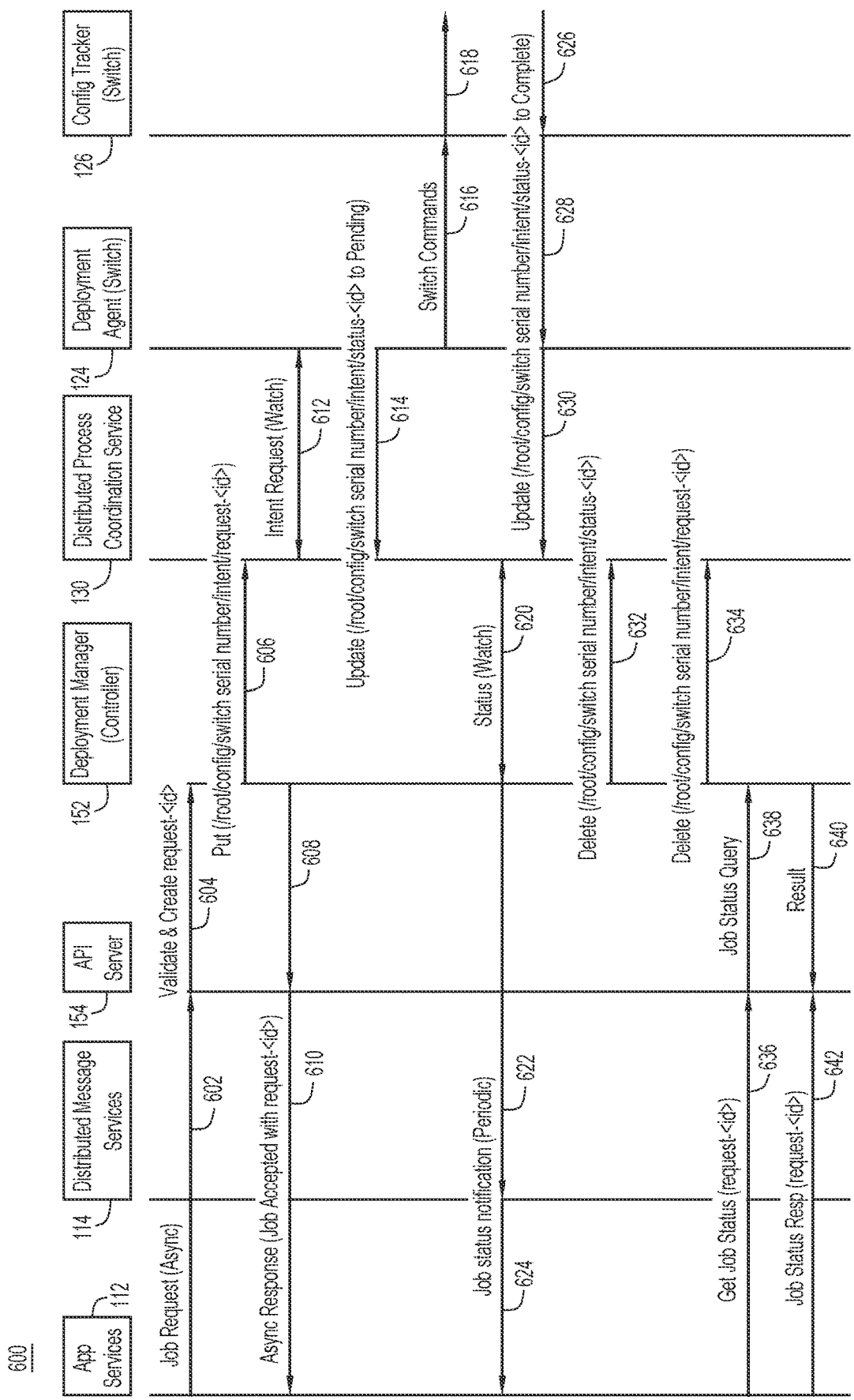
FIG. 6 illustrates a flow diagram for deploying an intent to a switch, according to an example embodiment.

With continued reference to FIG. 1, FIG. 6 illustrates a flow diagram of an example method 600 for intent deployment in a network environment. While the operations of FIG. 6 are described as deploying an intent to a switch 122 of switching fabric 120, it will be appreciated that these operations may be used to deploy the same or different intents to any quantity of switches. It will be further appreciated that an intent or configuration may be deployed in substantially the same manner described below to any quantity of network devices. A network device may be any device that is a component of, coupled to, or uses a network. For example, a network device may include a router, switch, hub, node, or other processing device.

Initially, network controller 110 receives a deployment request from client system 160 to deploy an intent to a switch 122 of switching fabric 120. For example, the intent may be specified from a template or workflow entered by a user in a graphical user interface (GUI) provided by application services 112 and presented by client system 160 as described above. The deployment request may further be initiated from the GUI. Application services 112 analyze the intent to generate deployment information for implementing the intent. For example, the deployment information may include a set of one or more command line interface (CLI) commands.

At operation 602, application services 112 send a job request to API server 154 of network controller 110 to deploy an intent to switch 122. API server 154 provides application programming interfaces (APIs) to specify to deployment manager 152 the deployment information and one or more switches for the deployment. The API server validates and creates a request identifier and corresponding key (e.g., request-<id>), and provides the deployment request to deployment manager 152 at operation 604. At operation 606, deployment manager 152 writes the deployment information (e.g., set of CLI commands, etc.) to distributed process coordination service 130 in a directory corresponding to switch 122 as described above. As discussed above, an example directory path for switch 122 may be of the form: /root/config/switch serial number/intent/, where the switch serial number indicates a serial number of the corresponding switch.

One or more keys associated with deployment requests may be stored within the directory associated with the switch. As discussed above, an example path to reference the key (e.g., request-<id>) may be of the form: /root/config/switch serial number/intent/request-<id>, where the key and request identifier are created by API server 154 to identify the particular request. The value of the key includes the deployment information (e.g., the set of command line interface (CLI) commands, etc.) to deploy the intent on the corresponding switch. Thus, the request identifier basically forms the key for a deployment request within a directory corresponding to a switch, where the key has a value containing the deployment information as described above.

At operations 608 and 610, an acknowledgement that the job has been accepted is sent from deployment manager 152 through API server 154 to application services 112. In an example embodiment, the job request and acknowledgment are provided asynchronously, where the acknowledgment may indicate that the job was accepted and provide the key with the request identifier. At operation 612, a request to detect deployment requests is initiated from deployment agent 124 of switch 122 to distributed process coordination service 130. Distributed process coordination service 130 provides notifications in response to changes to directories or key values. Accordingly, when a new deployment request is written to the corresponding directory, a notification is provided to deployment agent 124 of the corresponding switch indicating information pertaining to the change (e.g., directory, key, type of change, etc.).

When a deployment request is detected, deployment agent 124 writes an updated status notification to distributed process coordination service 130 to indicate a pending deployment status at operation 614. The status information is written as a value of a key within the corresponding switch directory based on a status identifier. As discussed above, an example path to reference the key (e.g., status-<id>) may be of the form: /root/config/switch serial number/intent/status-<id>, where the switch serial number is the serial number of switch 122 and id is the status identifier for the status notification. Thus, the status identifier basically forms the key for a status notification within a directory corresponding to a switch, where the key has a value containing the status notification as described above. However, the keys for the deployment request and status notification may reside in the same or different directories within the directory structure.

At operation 616, deployment agent 124 retrieves the deployment information (e.g., the set of command line interface (CLI) commands, etc.)) of the intent from distributed process coordination service 130 based on the change information and detected key, and provides the retrieved set of CLI commands to configuration tracker 126. The configuration tracker provides the set of CLI commands to CLI server 350 (FIG. 3) at operation 618 to configure switch 122. At operation 620, a request to detect status notifications is initiated from deployment manager 152 of network controller 110. The distributed process coordination service provides notifications in response to changes to directories or key values. Accordingly, when a new status notification is written to the corresponding directory, a notification is provided to deployment manager 152 indicating information pertaining to the change (e.g., directory, key, type of change, etc.).

The status of the job or deployment request is periodically sent from deployment manager 152 to distributed message services 114 at operation 622, and provided from the distributed message services to application services 112 at operation 624. For example, this may be accomplished by application services 112 subscribing to topics receiving the status notifications within distributed message services 114. The deployment manager may aggregate or combine information within status notifications, and report a current status based on the aggregated information to distributed message services 114 at any desired time intervals (e.g., periodic, for specific quantities of CLI commands, for specific quantities of status notifications, etc.).

When configuration tracker 126 receives from CLI server 350 (FIG. 3) an indication of successful execution for the last or final CLI command at operation 626 (e.g., indicating successful completion for the set of CLI commands of the deployment information), the configuration tracker informs deployment agent 124 at operation 628. Deployment agent 124 writes an updated status notification to distributed process coordination service 130 to indicate a completed deployment status at operation 630. For example, the deployment agent may write the updated status of the completed deployment request under the key (e.g., status-<id>) referenced by a path of the form: /root/config/switch serial number/intent/status-<id> as described above.

In response to detecting the completed status, deployment manager 152 deletes the key within distributed process coordination service 130 containing the status notification for the deployment request at operation 632. With respect to the example discussed above, the deployment manager may delete the key (e.g., status-<id>) within the directory corresponding to the switch, where the key is referenced by the path: /root/config/switch serial number/intent/status-<id>. Deployment manager 152 also deletes the key within distributed process coordination service 130 containing the deployment request at operation 634. With respect to the example discussed above, the deployment manager may delete the key (e.g., request-<id>) within the directory corresponding to the switch, where the key is referenced by the path: /root/config/switch serial number/intent/request-<id>. This effectively removes the deployment request from the distributed process coordination service upon completion of the deployment. In an example embodiment, the request identifier and status identifier may be re-used for subsequent deployment requests and status notifications after the keys for the completed deployment request and corresponding status notifications have been deleted.

At operation 636, application services 112 sends a job status request indicating the deployment request key from the acknowledgment to API server 154. The API server generates and sends a job status query to deployment manager 152 at operation 638. The deployment manager determines a final response to the deployment request based on status notifications or updates from switch 122, and sends a result to API server 154 at operation 640. The API server (via APIs for application services 112) generates and sends to application services 112 a job status response to the job status request based on the result at operation 642. Application services 112 may forward the job status response to client system 160.

Figure 7:
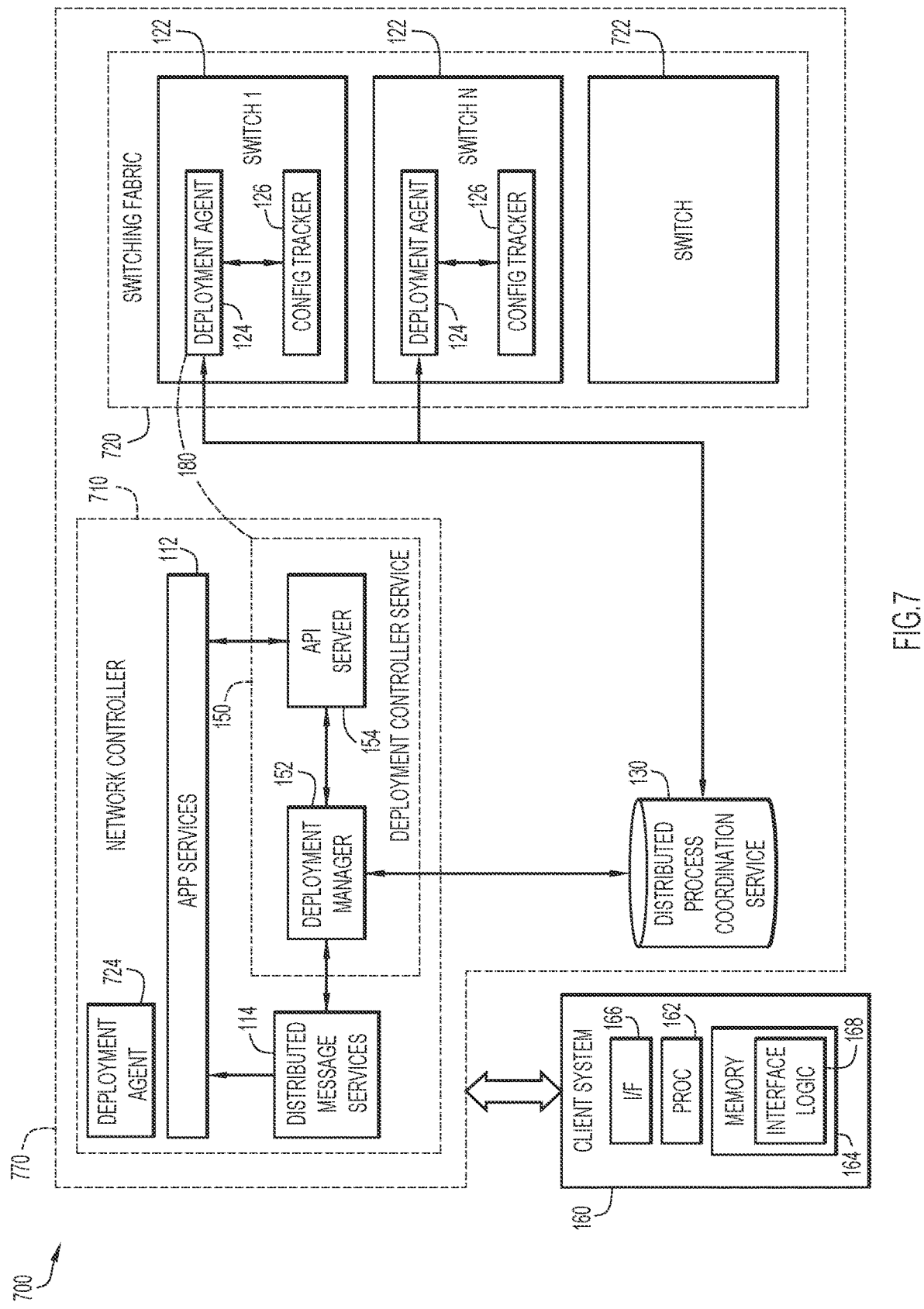
FIG. 7 illustrates a block diagram of a system configured for intent deployment, according to another example embodiment.

In some scenarios, a switching fabric may include one or more switches that lack deployment agent 124 and configuration tracker 126 to locally deploy an intent. For example, this capability may not be needed or desired, or a switch may be unable to support the capability. FIG. 7 illustrates a block diagram of an example system 700 configured for intent deployment according to another example embodiment. System 700 is substantially similar to system 100 described above, and includes a network controller 710, a switching fabric 720, distributed process coordination service 130, and client or end-user system 160. Network controller 710, switching fabric 720, and distributed process coordination service 130 may form a datacenter 770. However, any conventional or other type of network environment may be utilized. The datacenter components may communicate over a network (not shown) providing internal and/or external communications for the datacenter. Client system 160 is substantially similar to the client system described above, and may reside within datacenter 770 or be remote from datacenter 770 and communicate with the datacenter over the network.

Network controller 710 is substantially similar to network controller 110 described above, and may be hosted in a multi-node container cluster that may further host distributed process coordination service 130. For example, the container cluster may be implemented by a Kubernetes (K8s) cluster including three nodes; however, any conventional or other container or type of computing cluster of any quantity of nodes may be employed. Switching fabric 720 is substantially similar to switching fabric 120 described above and, by way of example, includes one or more switches 122 (e.g., Switch 1 to Switch N as viewed in FIG. 7) and one or more switches 722 to form one or more networks for the datacenter or other network environment. Switches 122 are substantially similar to switches 122 described above, and include deployment agent 124 and configuration tracker 126. Switches 122 operate in substantially the same manner described above to locally deploy an intent.

Switches 722 are substantially similar to switches 122 described above, but lack deployment agent 124 and configuration tracker 126 to locally deploy an intent. In order to deploy an intent to these types of switches, network controller 710 includes the deployment agent service including one or more deployment agents 724. Deployment agents 724 may reside on nodes of the container cluster and may be associated with one or more switches 722. For example, a deployment agent 724 may be disposed on each node of the container cluster to distribute the load. However, any distribution of the deployment agents on the cluster nodes and any assignment of any quantity of switches 722 to deployment agents 724 may be employed. In addition, switching fabric 720 may include any quantity of switches 122 and switches 722. For example, switching fabric 720 may include only switches 122, only switches 722, or a combination of any quantities of switches 122 and switches 722.

System 700 further includes infrastructure service 180 for intent deployment. The infrastructure service serves as a transport for network controller applications to communicate with switches 122 of switching fabric 720 through distributed process coordination service 130. The infrastructure service includes deployment controller service 150 on network controller 710 and a deployment agent service including a deployment agent 124 and configuration tracker 126 residing on each switch 122, each as described above. Deployment controller service 150 includes deployment manager 152 and application programming interface (API) server 154, each as described above. Network controller 710 further includes application services 112 and distributed message services 114 each as described above. The infrastructure service operates in substantially the same manner described above to deploy an intent to switches 122.

In order to deploy an intent to switches 722, network controller 710 operates in substantially the same manner as network controller 110 (as described above for FIG. 4) to receive deployment requests and write deployment information (e.g., a set of one or more command line interface (CLI) commands, etc.) to distributed process coordination service 130. However, deployment agent 724 of network controller 710 monitors the distributed process coordination service for deployment requests for switches 722. When a deployment request is detected for a switch 722, deployment agent 724 handling the switch 722 establishes a secure shell (SSH) or other connection to the switch to provide the CLI commands of the deployment information to CLI server 350 (FIG. 3) for execution to configure the switch. The connection further provides results of command execution from switch 722 to deployment agent 724 for posting status notifications to distributed process coordination service 130. Deployment manager 152 detects and processes the status notifications in distributed process coordination service 130 to provide status updates to application services 112 through distributed message services 114 in substantially the same manner described above.

Deployment requests may be generated to deploy an intent to any individual or combination of switches within switching fabric 720. For example, an initial deployment request may be generated to deploy an intent to only switches 122, while a subsequent deployment request may be generated to deploy an intent to only switches 722. Further, a deployment request may be generated to deploy an intent to a combination of any quantities of switches 122 and switches 722. Deployment agent 724 is typically utilized to deploy an intent to switches 722. However, deployment agent 724 may be utilized to deploy an intent to switches 122 in substantially the same manner described below.

Figure 8:
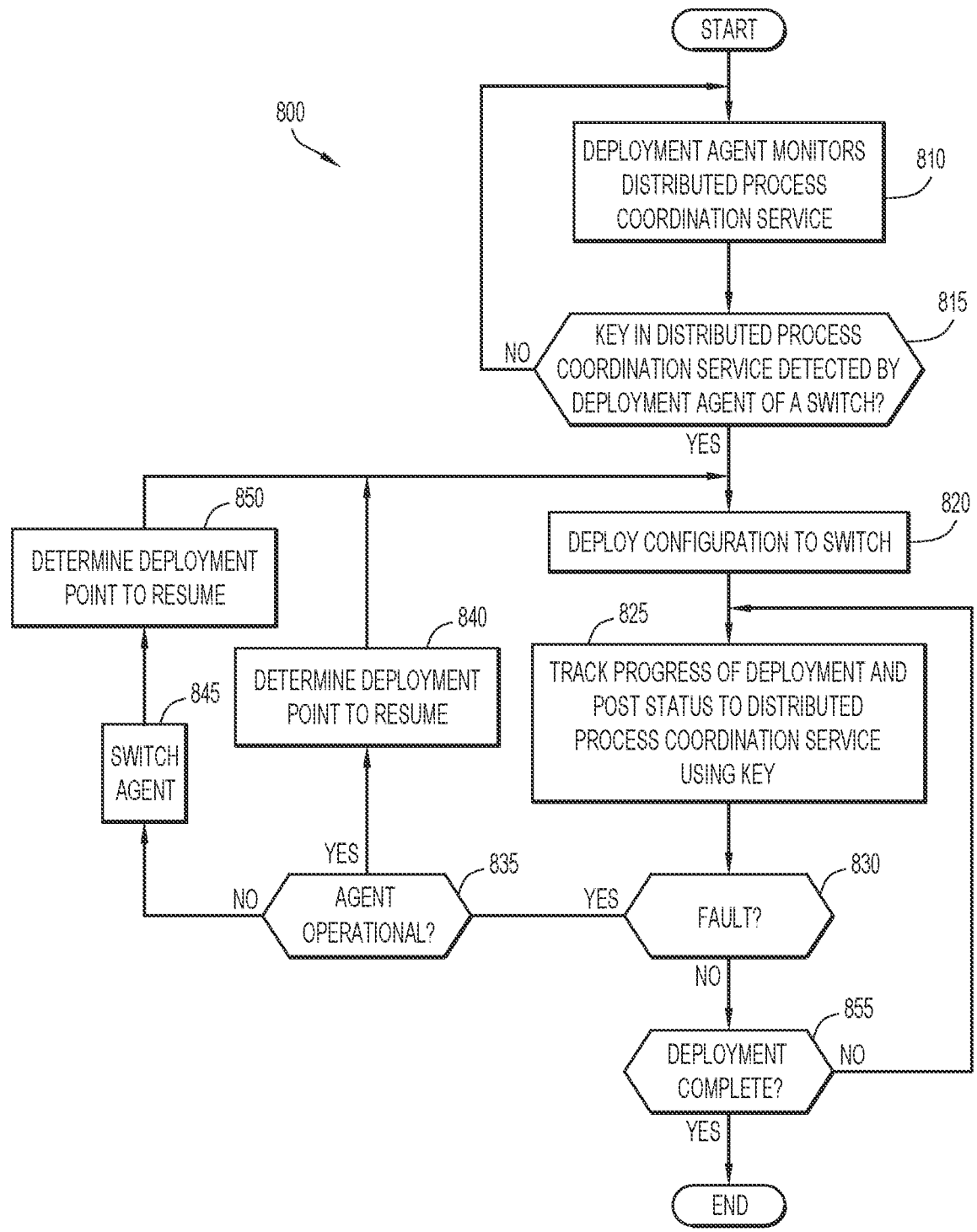
FIG. 8 illustrates a flowchart of a method to deploy an intent to a switch, according to another example embodiment.

With continued reference to FIG. 7, FIG. 8 illustrates a flowchart of an example method 800 for deploying an intent to switching fabric 720 according to an example embodiment. While the operations of FIG. 7 are described with reference to a switch 722, it will be appreciated that these operations may deploy the same or different intents to any quantity of switches 722. It will be further appreciated that other components of system 700 may additionally/alternatively perform any of these operations. In addition, while the operations of FIG. 7 are described with respect to deploying an intent to a switch, an intent or configuration may be deployed in substantially the same manner described below to any quantity of network devices. A network device may be any device that is a component of, coupled to, or uses a network. For example, a network device may include a router, switch, hub, node, or other processing device.

Initially, deployment agent 724 is installed on the network controller (or container cluster) along with the required information (e.g., certificates, credentials, etc.) for accessing distributed process coordination service 130.

Deployment agent 724 monitors distributed process coordination service 130 for a deployment request for an associated switch 722 at operation 810. Deployment manager 152 of network controller 710 writes deployment information to a corresponding directory of distributed process coordination service 130 for each switch specified in a request for intent deployment as described above. For example, a directory path for a switch 722 may be of the form: /root/config/serial number/intent/, where the switch serial number indicates a serial number of the corresponding switch. One or more keys associated with deployment requests may be stored within the directory associated with the directory path. For example, the key (e.g., request-<id>) may be referenced by a path of the form: /root/config/switch serial number/intent/request-<id>, where id is the request identifier that forms the key to identify the particular request as described above. The value of the key includes the deployment information to deploy the intent on the corresponding switch. The deployment information may include a set of command line interface (CLI) commands generated by application services 112 to deploy the intent as described above.

Deployment agent 724 monitors a corresponding directory for switch 722 for a deployment request. Distributed process coordination service 130 provides notifications in response to changes to directories or key values. Accordingly, when a new deployment request is written to the corresponding directory, a notification is provided to deployment agent 724 indicating information corresponding to the change (e.g., directory, key, type of change, etc.). When a deployment request is detected by deployment agent 724 at operation 815, the deployment agent deploys the intent of the deployment request at operation 820. This may be accomplished by deployment agent 724 retrieving the deployment information (e.g., set of command line interface (CLI) commands, etc.) from distributed process coordination service 130 based on the change information and detected key, and opening a secure shell (SSH) or other session to CLI server 350 (FIG. 3). Deployment agent 724 provides the set of CLI commands of the deployment information to CLI server 350 to execute the commands in order to configure switch 722. The CLI commands are preferably executed one command at a time; however, any quantity of commands may be executed at a time.

Deployment agent 724 receives over the connection a status of each command execution from switch 722 to track progress of the intent deployment. Deployment agent 724 posts or writes a status notification to distributed process coordination service 130 at operation 825. For example, the progress may be determined based on a quantity of CLI commands executed for the deployment request. In an example embodiment, a status notification is provided for each command line interface (CLI) command in the set of CLI commands for the intent. The status information is written as a value of a key within the corresponding switch directory (e.g., intent directory as described above) based on a status identifier. For example, the key (e.g., status-<id>) may be referenced by a path of the form: /root/config/switch serial number/intent/status-<id>, where the switch serial number is the serial number of switch 122 and id is the status identifier for the status notification. Thus, the status identifier basically forms the key for a status notification within a directory corresponding to a switch, where the key has a value containing the status notification. For example, a status identifier of '1234' may correspond to its request identifier of '1234' and may be used to produce a key of the form 'status-1234'; however, the key may have any desired type of characters and format (e.g., numeric, alphanumeric, symbols, etc.). The keys for the deployment request and status notification may reside in the same or different directories within the directory structure. The status identifier may assist in determining a point to resume an intent deployment in case of a failure. The status identifier may correspond to its request identifier, may be any suitable identifier in any format (e.g., numeric, alphanumeric, symbols, etc.), preferably uniquely identifies a status notification, and may be generated in various manners. For example, a counter may be incremented by any desired increment (e.g., 1, 2, 5, 10, 100, etc.) to generate the status identifier, or a random number/sequence generator may be employed.

By way of example only, the status notification may indicate a most recent command in the deployment information that was executed (e.g., indicated by a command identifier or line number), success or failure of the command and a reason for the failure, and any output of a command when the command was issued. However, since minimal commands indicate output that needs to be processed, scale is not a concern.

During intent deployment, a fault may occur at operation 830. The fault may be caused by a restart of a process or device, or by a failure of deployment agent 724. When a process or device has been restarted (e.g., deployment agent 724 is operational) as determined at operation 835, deployment agent 724 determines a point to resume the intent deployment from where the deployment was interrupted at operation 840. This may be accomplished by analyzing information in the status notifications and deployment information in distributed process coordination service 130. For example, the CLI commands for the intent deployment are stored in the distributed process coordination service along with the status notifications including information indicating the last successfully executed command for the intent deployment. Based on this information, deployment agent 724 may determine to resume the intent deployment from the stored CLI command after the last successfully completed command indicated in the status notifications. The intent deployment resumes from the determined point in the prior intent deployment process at operation 820 to deploy the intent as described above.

When the fault is due to an inoperable deployment agent 724 as determined at operation 835, a new deployment agent 724 is employed to perform the intent deployment at operation 845. For example, the new deployment agent 724 may be from the same or different container cluster node, and may be selected based on load sharing. At operation 850, the new deployment agent 724 determines a point to resume the intent deployment from where the deployment was interrupted. This may be accomplished by analyzing information in the status notifications and deployment information in distributed process coordination service 130. Network controller 710 may maintain the switch identifiers, and provide the switch identifier for switch 722 to the new deployment agent to enable the new deployment agent to access distributed process coordination service 130 and retrieve deployment information for that switch. For example, the CLI commands for the intent deployment are stored in distributed process coordination service 130 along with the status notifications including information indicating the last successfully executed command for the intent deployment. Based on this information, the new deployment agent 724 may determine to resume the intent deployment from the stored CLI command after the last successfully completed command indicated in the status notifications. The intent deployment resumes from the determined point in the prior intent deployment process at operation 820 to deploy the intent as described above.

When further processing remains for the intent deployment as determined at operation 855, deployment agent 724 (or the new deployment agent 724 selected at operation 845) monitors further progress of the intent deployment and posts status notifications to distributed process coordination service 130 at operation 825 as described above. The above process is repeated until the intent deployment is completed as determined at operation 855.

FIG. 9 is a flowchart of an example method 900 for deploying intent within a network environment. At operation 910, a network device detects when a deployment request for the network device from a network controller is stored in a directory corresponding to the network device. Deployment information is stored as a value of a first key in the directory and includes information to configure the network device to attain a set of goals. At operation 920, the network device retrieves the deployment information from the directory. At operation 930, the network device is configured to attain the set of goals by the network device applying the retrieved deployment information. At operation 940, the network device generates one or more status notifications indicating a status of configuring the network device, and stores the one or more status notifications as a value of a second key in the directory to indicate the status to the network controller.

The programs, software, and services described herein (e.g., application services 112, distributed message services 114, deployment manager 152, API server 154, deployment agent 124, configuration tracker 126, interface logic 168, deployment agent 724, etc.) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other stores or repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., graphical user interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, standalone systems, datacenters, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software. These systems may include any types of monitors and input devices (e.g., keyboard, mouse, voice recognition, etc.) to enter and/or view information.

It is to be understood that the software of the present embodiments (e.g., application services 112, distributed message services 114, deployment manager 152, API server 154, deployment agent 124, configuration tracker 126, interface logic 168, deployment agent 724, etc.) may be implemented in any desired computer language and could be developed by one of ordinary skill in the computer arts based on the functional descriptions contained in the specification and flow charts and diagrams illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client, server, and other processing systems, and/or any other intermediary processing devices. The software and/or algorithms described above and illustrated in the flow charts and diagrams may be modified in any manner that accomplishes the functions described herein. In addition, the functions in the flow charts, diagrams, or description may be performed in any order that accomplishes a desired operation.

The networks of present embodiments may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

In various embodiments, entities as described herein may store data/information in any suitable volatile and/or nonvolatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) and/or storage can store data, software, code, instructions (e.g., processor instructions), logic, parameters, combinations thereof, and/or the like used for operations described herein. This includes the memory elements and/or storage being able to store data, software, code, instructions (e.g., processor instructions), logic, parameters, combinations thereof, or the like that are executed to carry out operations in accordance with teachings of the present disclosure.

In some instances, software of the present embodiments (e.g., application services 112, distributed message services 114, deployment manager 152, API server 154, deployment agent 124, configuration tracker 126, interface logic 168, deployment agent 724, etc.) may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fib®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Any Internet Protocol (IP) addresses discussed herein can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided. The method comprises: detecting, at a network device, when a deployment request for the network device from a network controller is stored in a directory corresponding to the network device, wherein deployment information is stored as a value of a first key in the directory and includes information to configure the network device to attain a set of goals; retrieving by the network device the deployment information from the directory; configuring the network device to attain the set of goals by the network device applying the retrieved deployment information; and generating, by the network device, one or more status notifications indicating a status of configuring the network device and storing the one or more status notifications as a value of a second key in the directory to indicate the status to the network controller.

In one example, the network device includes a switch.

In one example, the deployment request indicates an intent to deploy to the network device.

In one example, the deployment information includes a set of command line interface commands to configure the network device.

In one example, applying the retrieved deployment information includes: executing by the network device the set of command line interface commands to configure the network device.

In one example, in response to occurrence of a fault during configuration of the network device: determining by the network device a last command line interface command successfully executed during the configuration of the network device prior to occurrence of the fault based on the stored deployment information and the one or more status notifications; and resuming the configuration by the network device from a command line interface command subsequent the determined command line interface command.

In one example, the network controller includes a deployment agent, and the method further comprises: detecting, by the deployment agent, when a second deployment request for a second network device from the network controller is stored in a directory corresponding to the second network device, wherein deployment information for the second deployment request is stored in the directory corresponding to the second network device and includes information to configure the second network device to attain a second set of goals; retrieving, by the deployment agent, the deployment information for the second deployment request from the directory corresponding to the second network device and establishing a connection to the second network device; sending, by the deployment agent, the retrieved deployment information for the second deployment request to the second network device over the connection to apply the deployment information for the second deployment request to configure the second network device to attain the second set of goals; and generating, by the deployment agent, one or more second status notifications indicating a status of configuring the second network device and storing the one or more second status notifications in the directory corresponding to the second network device to indicate the status of configuring the second network device to the network controller.

In one example, the deployment information for the second deployment request includes a set of command line interface commands to configure the second network device, and the method further comprises: in response to occurrence of a fault during configuration of the second network device: determining by the deployment agent a last command line interface command successfully executed during the configuration of the second network device prior to occurrence of the fault based on the stored deployment information for the second deployment request and the one or more second status notifications; and resuming the configuration of the second network device by the deployment agent from a command line interface command subsequent the determined command line interface command.

In one example, the network controller further includes a second deployment agent and the deployment information for the second deployment request includes a set of command line interface commands to configure the second network device, and the method further comprises: in response to occurrence of a fault during configuration of the second network device: designating the second deployment agent to configure the second network device; determining by the second deployment agent a last command line interface command successfully executed during the configuration of the second network device prior to occurrence of the fault based on the stored deployment information for the second deployment request and the one or more second status notifications; and resuming the configuration of the second network device by the second deployment agent from a command line interface command subsequent the determined command line interface command.

In another form, an apparatus is provided. The apparatus comprises: a network controller; and a network device including one or more processors, wherein the one or more processors are configured to: detect when a deployment request for the network device from the network controller is stored in a directory corresponding to the network device, wherein deployment information is stored as a value of a first key in the directory and includes information to configure the network device to attain a set of goals; retrieve the deployment information from the directory; configure the network device to attain the set of goals by applying the retrieved deployment information; and generate one or more status notifications indicating a status of configuring the network device and store the one or more status notifications as a value of a second key in the directory to indicate the status to the network controller.

In another form, one or more non-transitory computer readable storage media are provided. The non-transitory computer readable storage media are encoded with processing instructions that, when executed by one or more processors of a network device, cause the one or more processors of the network device to: detect when a deployment request for the network device from a network controller is stored in a directory corresponding to the network device, wherein deployment information is stored as a value of a first key in the directory and includes information to configure the network device to attain a set of goals; retrieve the deployment information from the directory; configure the network device to attain the set of goals by applying the retrieved deployment information; and generate one or more status notifications indicating a status of configuring the network device and store the one or more status notifications as a value of a second key in the directory to indicate the status to the network controller.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    detecting, at a network device, when a deployment request for the network device from a network controller is stored in a directory corresponding to the network device, wherein deployment information is stored as a value of a first key in the directory and includes information to configure the network device to attain a set of goals;
    retrieving by the network device the deployment information from the directory;
    configuring the network device to attain the set of goals by the network device applying the retrieved deployment information; and
    generating, by the network device, one or more status notifications indicating a status of configuring the network device and storing the one or more status notifications as a value of a second key in the directory to indicate the status to the network controller.

2. The method of claim 1, wherein the network device includes a switch.

3. The method of claim 1, wherein the deployment request indicates an intent to deploy to the network device.

4. The method of claim 1, wherein the deployment information includes a set of command line interface commands to configure the network device.

5. The method of claim 4, wherein applying the retrieved deployment information includes:
    executing by the network device the set of command line interface commands to configure the network device.

6. The method of claim 5, further comprising:
    in response to occurrence of a fault during configuration of the network device:
        determining by the network device a last command line interface command successfully executed during the configuration of the network device prior to occurrence of the fault based on the stored deployment information and the one or more status notifications; and
        resuming the configuration by the network device from a command line interface command subsequent the determined command line interface command.

7. The method of claim 1, wherein the network controller includes a deployment agent, and the method further comprises:
    detecting, by the deployment agent, when a second deployment request for a second network device from the network controller is stored in a directory corresponding to the second network device, wherein deployment information for the second deployment request is stored in the directory corresponding to the second network device and includes information to configure the second network device to attain a second set of goals;
    retrieving, by the deployment agent, the deployment information for the second deployment request from the directory corresponding to the second network device and establishing a connection to the second network device;
    sending, by the deployment agent, the retrieved deployment information for the second deployment request to the second network device over the connection to apply the deployment information for the second deployment request to configure the second network device to attain the second set of goals; and
    generating, by the deployment agent, one or more second status notifications indicating a status of configuring the second network device and storing the one or more second status notifications in the directory corresponding to the second network device to indicate the status of configuring the second network device to the network controller.

8. The method of claim 7, wherein the deployment information for the second deployment request includes a set of command line interface commands to configure the second network device, and the method further comprises:
    in response to occurrence of a fault during configuration of the second network device:
        determining by the deployment agent a last command line interface command successfully executed during the configuration of the second network device prior to occurrence of the fault based on the stored deployment information for the second deployment request and the one or more second status notifications; and
        resuming the configuration of the second network device by the deployment agent from a command line interface command subsequent the determined command line interface command.

9. The method of claim 7, wherein the network controller further includes a second deployment agent and the deployment information for the second deployment request includes a set of command line interface commands to configure the second network device, and the method further comprises:
    in response to occurrence of a fault during configuration of the second network device:

designating the second deployment agent to configure the second network device;
determining by the second deployment agent a last command line interface command successfully executed during the configuration of the second network device prior to occurrence of the fault based on the stored deployment information for the second deployment request and the one or more second status notifications; and
resuming the configuration of the second network device by the second deployment agent from a command line interface command subsequent the determined command line interface command.

10. An apparatus comprising:
a network controller; and
a network device including one or more processors, wherein the one or more processors are configured to:
detect when a deployment request for the network device from the network controller is stored in a directory corresponding to the network device, wherein deployment information is stored as a value of a first key in the directory and includes information to configure the network device to attain a set of goals;
retrieve the deployment information from the directory;
configure the network device to attain the set of goals by applying the retrieved deployment information; and
generate one or more status notifications indicating a status of configuring the network device and store the one or more status notifications as a value of a second key in the directory to indicate the status to the network controller.

11. The apparatus of claim 10, wherein the network device includes a switch.

12. The apparatus of claim 10, wherein the deployment request indicates an intent to deploy to the network device.

13. The apparatus of claim 10, wherein the deployment information includes a set of command line interface commands to configure the network device, and the one or more processors are further configured to:
in response to occurrence of a fault during configuration of the network device:
determine a last command line interface command successfully executed during the configuration of the network device prior to occurrence of the fault based on the stored deployment information and the one or more status notifications; and
resume the configuration of the network device from a command line interface command subsequent the determined command line interface command.

14. The apparatus of claim 10, wherein the apparatus further comprises a second network device and the network controller includes a deployment agent, and wherein the deployment agent is configured to:
detect when a second deployment request for the second network device from the network controller is stored in a directory corresponding to the second network device, wherein deployment information for the second deployment request is stored in the directory corresponding to the second network device and includes information to configure the second network device to attain a second set of goals;
retrieve the deployment information for the second deployment request from the directory corresponding to the second network device and establish a connection to the second network device;
send the retrieved deployment information for the second deployment request to the second network device over the connection to apply the deployment information for the second deployment request to configure the second network device to attain the second set of goals; and
generate one or more second status notifications indicating a status of configuring the second network device and store the one or more second status notifications in the directory corresponding to the second network device to indicate the status of configuring the second network device to the network controller.

15. The apparatus of claim 14, wherein the deployment information for the second deployment request includes a set of command line interface commands to configure the second network device, and the deployment agent is further configured to:
in response to occurrence of a fault during configuration of the second network device:
determine a last command line interface command successfully executed during the configuration of the second network device prior to occurrence of the fault based on the stored deployment information for the second deployment request and the one or more second status notifications; and
resume the configuration of the second network device from a command line interface command subsequent the determined command line interface command.

16. The apparatus of claim 14, wherein the network controller includes a second deployment agent and the deployment information for the second deployment request includes a set of command line interface commands to configure the second network device, and in response to occurrence of a fault during configuration of the second network device, the second deployment agent is configured to:
determine a last command line interface command successfully executed during the configuration of the second network device prior to occurrence of the fault based on the stored deployment information for the second deployment request and the one or more second status notifications; and
resume the configuration of the second network device from a command line interface command subsequent the determined command line interface command.

17. One or more non-transitory computer readable storage media encoded with processing instructions that, when executed by one or more processors of a network device, cause the one or more processors of the network device to:
detect when a deployment request for the network device from a network controller is stored in a directory corresponding to the network device, wherein deployment information is stored as a value of a first key in the directory and includes information to configure the network device to attain a set of goals;
retrieve the deployment information from the directory;
configure the network device to attain the set of goals by applying the retrieved deployment information; and
generate one or more status notifications indicating a status of configuring the network device and store the one or more status notifications as a value of a second key in the directory to indicate the status to the network controller.

18. The one or more non-transitory computer readable storage media of claim 17, wherein the network device includes a switch and the deployment request indicates an intent to deploy to the switch.

19. The one or more non-transitory computer readable storage media of claim 17, wherein the deployment information includes a set of command line interface commands to configure the network device, and the processing instructions further cause the one or more processors to:

execute the set of command line interface commands to configure the network device.

20. The one or more non-transitory computer readable storage media of claim 19, wherein the processing instructions further cause the one or more processors to:

in response to occurrence of a fault during configuration of the network device:
determine a last command line interface command successfully executed during the configuration of the network device prior to occurrence of the fault based on the stored deployment information and the one or more status notifications; and
resume the configuration of the network device from a command line interface command subsequent the determined command line interface command.

* * * * *